US008909430B2

(12) United States Patent
Choi et al.

(10) Patent No.: US 8,909,430 B2
(45) Date of Patent: Dec. 9, 2014

(54) ACTIVE DOOR LOCK SYSTEM

(71) Applicant: Hyundai Motor Company, Seoul (KR)

(72) Inventors: Sung Ho Choi, Suwon-si (KR); You Keun Kim, Anyang-si (KR); Dong Won Kim, Seoul (KR); Hyun Woon Park, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 126 days.

(21) Appl. No.: 13/710,399

(22) Filed: Dec. 10, 2012

(65) Prior Publication Data

US 2014/0081529 A1 Mar. 20, 2014

(30) Foreign Application Priority Data

Sep. 17, 2012 (KR) ........................ 10-2012-0102716

(51) Int. Cl.

| | |
|---|---|
| ***B60K 28/12*** | (2006.01) |
| ***E05B 77/26*** | (2014.01) |
| *E05B 81/76* | (2014.01) |
| *E05C 17/00* | (2006.01) |
| *E05F 15/20* | (2006.01) |

(52) U.S. Cl.

CPC ................. *E05B 77/26* (2013.01); *E05B 81/76* (2013.01); *E05C 17/006* (2013.01); *E05F 15/20* (2013.01); *E05Y 2400/358* (2013.01); *E05Y 2900/55* (2013.01)

USPC ............................................................ 701/45

(58) Field of Classification Search

None

See application file for complete search history.

(56) References Cited

U.S. PATENT DOCUMENTS

| | | | | |
|---|---|---|---|---|
| 5,574,315 | A * | 11/1996 | Weber | 307/10.1 |
| 6,922,622 | B2 * | 7/2005 | Dulin et al. | 701/45 |
| 7,170,401 | B1 * | 1/2007 | Cole | 340/457 |
| 7,489,247 | B2 * | 2/2009 | Lee et al. | 340/572.1 |
| 2003/0042793 | A1 * | 3/2003 | Li | 307/10.1 |
| 2005/0216133 | A1 * | 9/2005 | MacDougall et al. | 701/1 |
| 2008/0313965 | A1 * | 12/2008 | Sugawara | 49/449 |

FOREIGN PATENT DOCUMENTS

| | | | |
|---|---|---|---|
| DE | 3724802 | A * | 2/1989 |
| JP | 8028121 | A | 1/1996 |
| JP | 10140899 | A | 5/1998 |
| KR | 100135570 | B1 | 1/1998 |
| KR | 20080018539 | A | 2/1998 |
| KR | 20020030331 | A * | 4/2002 |

OTHER PUBLICATIONS

Machine Translation of KR 20020030331 A.*
Machine Translation of DE 3724802 A.*

* cited by examiner

*Primary Examiner* — John R Olszewski
*Assistant Examiner* — Navid Ziaeianmehdizadeh
(74) *Attorney, Agent, or Firm* — Morgan, Lewis & Bockius LLP

(57) ABSTRACT

An active door lock system allows a user to confirm a state of a child in a vehicle before opening a door by partially opening a window of the door in the case of sensing unlock of door lock from an outer side of the door in the state in which a child lock is set.

10 Claims, 3 Drawing Sheets

ACTIVE DOOR LOCK SYSTEM

CROSS-REFERENCE TO RELATED APPLICATION

The present application claims priority of Korean Patent Application Number 10-2012-0102716 filed Sep. 17, 2012, the entire contents of which application is incorporated herein for all purposes by this reference.

BACKGROUND OF INVENTION

1. Field of Invention

The present invention relates to an active door lock system, and more particularly, to an active door lock system partially opening a window of a door in the case of sensing unlock of door lock from an outer side of the door in the state in which a child lock is set.

2. Description of Related Art

An inner side of each door of a vehicle is mounted with a switch allowing a user to manually lock/unlock the door and a lever allowing the user to open the door. Therefore, the user may lock/unlock the door through the switch and open the door by pulling the lever.

Recently, each door is mounted with a child lock pin allowing the door not to be opened in spite of pulling the lever after unlocking the door in order to protect a child.

The child lock pin is mounted at a position that is not accessible in the state in which the door is closed to allow the child in the vehicle not to arbitrarily open the door.

Meanwhile, even in the state in which the child lock pin is set (locked), the door may be opened using a door open lever mounted at an outer side of the door.

However, in most of the vehicles, since a direct sunlight blocking film is attached to a window of the door in order to block direct sunlight, a case in which the user opens the door in the situation in which he/she may not confirm a state of the child in the vehicle, such that the child is injured has been often generated. That is, there is the case in which the user suddenly opens the door from the outside of the vehicle in the situation in which the child in the vehicle holds a door knob, such that the child falls from the vehicle.

Therefore, a method of allowing a state of the child in the vehicle to be confirmed in the case in which the door is opened from the outside in the state in which the child lock is set has been demanded.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the above-mentioned problems occurring in the prior art while advantages achieved by the prior art are maintained intact.

Various aspects of the present invention provide for an active door lock system allowing a user to confirm a state of a child in a vehicle before opening a door by partially opening a window of the door in the case of sensing unlock of door lock from an outer side of the door in the state in which a child lock is set.

Various aspects of the present invention provide for an active door lock system including: a child lock setting unit setting child lock for locking a door of a vehicle; a first door lock unlocking unit sensing a touch of a user by a touch sensor positioned at an outer side of the door of the vehicle to unlock door lock; a window driving unit opening a window of the vehicle; and a controlling unit controlling the window driving unit to open the window of the corresponding door when the door lock is unlocked by the first door lock unlocking unit in the state in which the child lock is set.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
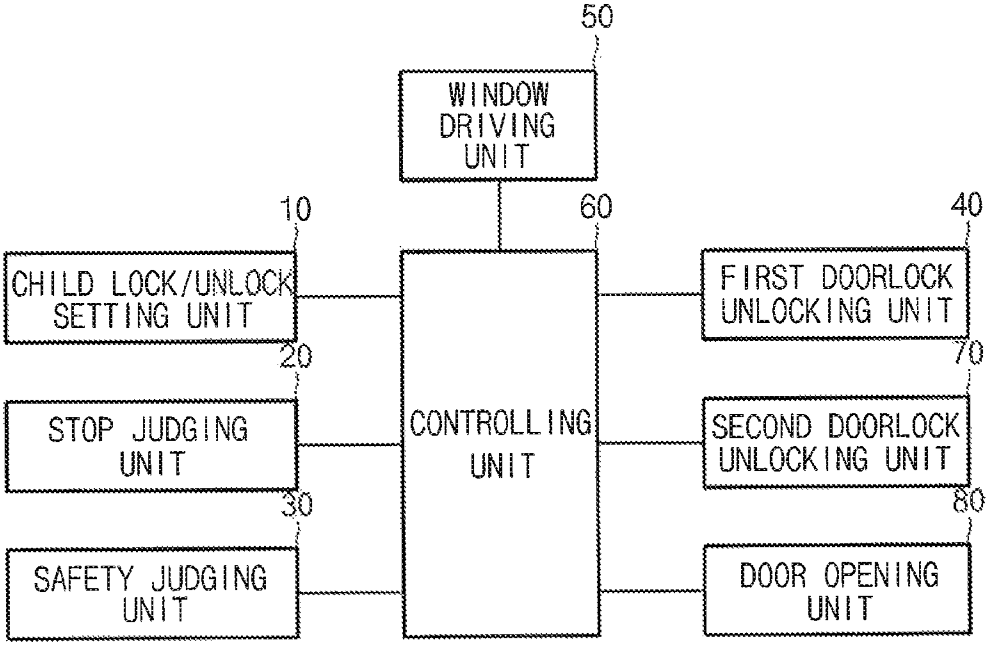
FIG. 1 is a configuration diagram of an exemplary active door lock system according to the present invention.

FIG. 1 is a configuration diagram of an active door lock system according to various embodiments of the present invention.

As shown in FIG. 1, the active door lock system according to various embodiments of the present invention is configured to include a child lock/unlock setting unit 10, a stop judging unit 20, a safety judging unit 30, a first door lock unlocking unit 40, a window driving unit 50, and a controlling unit 60. In addition, the active door lock system according to various embodiments of the present invention further include a second door lock unlocking unit 70 and a door opening unit 80.

The above-mentioned respective components will be described. First, the child lock/unlock setting unit 10 performs a function of locking a door so that a child in a vehicle may not arbitrarily open the door. In the case in which the door is locked by the child lock/unlock setting unit 10, the door may not be opened at an inner side of the vehicle.

The child lock/unlock setting unit 10 may be implemented by a child lock pin positioned at a lower end of the door and allowing to a driver to set lock/unlock of the door or a child lock/unlock lock button positioned at an arm rest installed at an inner side of a driver's seat door trim and allowing the driver to simply set lock/unlock of the door.

Next, the stop judging unit 20 judges whether or not the vehicle stops together with a speedometer in a cluster in the vehicle.

Next, the safety judging unit 30 senses obstacles (other vehicles or motorcycles) approaching the vehicle by radar sensors mounted in the left and the right of the rear of the vehicle and the front of the vehicle to judge whether or not a passenger may safely get off the vehicle.

Next, the first door lock unlocking unit 40 includes a touch sensor 200 disposed at an outer side (an outdoor side) of the door of the vehicle to sense a touch of a user that intends to open the door, thereby unlocking door lock. The first door lock unlocking unit 40 may unlock the door lock when it senses a touch of a finger of the user even in the case in which child lock is set. Here, the first door lock unlocking unit 40 may be operated in the case in which a smart key is possessed by the user and is positioned in the vehicle.

Figure 2:
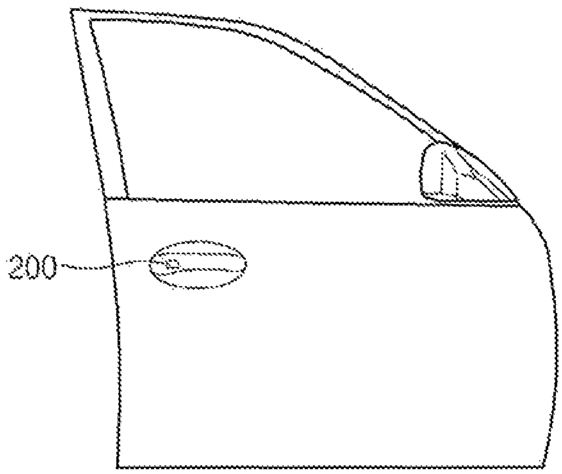
FIG. 2 is a diagram showing an example of a first door lock unlocking unit according to the present invention.

Here, the touch sensor 200 mounted at the outer side of the door has a shape as shown in FIG. 2.

Next, the window driving unit 50 opens a window according to a control of the controlling unit 50. In this case, the window driving unit 50 opens the window by a preset length, which may be about 10 cm. The window driving unit 50 may also open the window according to time setting rather than the length setting. In this case, a set time may be 1 to 2 seconds.

Next, the controlling unit 50 controls the window driving unit 50 to open the window of the corresponding door when the door lock is unlocked by the first door lock unlocking unit 40 in the state in which the child lock is set.

In various embodiments, the controlling unit 50 may also control the window driving unit 50 to open the window of the corresponding door when the door lock is unlocked by the first door lock unlocking unit 40 in the state in which the child lock is set and the vehicle stops.

In various embodiments, the controlling unit 50 may also control the window driving unit 50 to open the window of the corresponding door when the door lock is unlocked by the first door lock unlocking unit 40 in the state in which the child lock is set, the vehicle stops, and the passenger may safely get off the vehicle.

The active door lock system including the above-mentioned components allows the user to confirm the state of the child in the vehicle before opening the door, thereby making it possible to solve a problem that the child that is holding the door falls from the vehicle while the door is opened from the outside, such that he/she is injured.

However, in the case in which the child lock is set, the door lock may not be unlocked in the vehicle as long as the driver does not unlock the child lock. That is, in the case in which a protector and the child are positioned on the rear seats of the vehicle, the protector may not unlock the door lock when the driver does not unlock the child lock.

The active door lock system according to various embodiments of the present invention further includes the second door lock unlocking unit 40 and the door opening unit 80 as additional components required for solve this problem.

The second door lock unlocking unit 40, which is a mechanical relay type of auxiliary button, is positioned at an inner side of the door of the vehicle and unlocks the door lock. In this configuration, in order to open the door, the door opening unit 80 should be operated in the state in which the auxiliary button is pressed. Here, the auxiliary button is pressed when predetermined pressure is applied thereto and returns to its original state when the pressure is released.

The door opening unit 80, which is an inside door lever, is used to open the door. That is, the passenger in the vehicle pulls the inside door lever to open the door. In this case, the auxiliary button should be in a state in which it is pressed. In the state in which the auxiliary button is not pressed, even though the inside door lever is pulled, the door is not opened.

Figure 3:
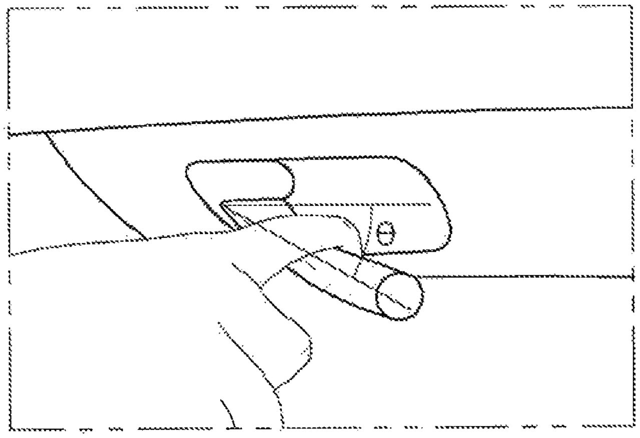
FIG. 3 is a diagram showing an example of an operation of a door opening unit according to the present invention.

Further, the door opening unit 80 adjusts a degree (angle) in which the lever is pulled as shown in FIG. 3, thereby making it possible to allow the child not to easily open the door even in the case in which the child lock is not set by the child lock/unlock setting unit 10. For example, when it is assumed that the angle $\theta_b$ at which the lever should be pulled when the door is opened is 30 degrees at ordinary times, the angle may be set to 60 degrees as much as possible. Here, in the case in which $\theta_b$=30 degrees, the angle ($\theta$) of the lever when the door is opened should exceeds 30 degrees.

As another example, the door may also be opened based on a time in which the lever is pulled. That is, the door is opened in the case in which the time in which the lever is pulled exceeds a threshold time.

As set forth above, according to various embodiments of the present invention, it is possible to allow the user to confirm the state of the child in the vehicle before opening the door by partially opening the window of the door in the case of sensing the unlock of the door lock from the outer side of the door in the state in which the child lock is set.

For convenience in explanation and accurate definition in the appended claims, the terms lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active door lock system comprising:

a child lock setting unit operably connected to a pin or a button, wherein the child lock setting unit is configured to set a child lock for locking a door of a vehicle when the pin or the button is operated;

a first door lock unlocking unit including a touch sensor disposed at an outer side of the door of the vehicle and electrically connected to the first door lock unlocking unit to detect a touch of a user by the touch sensor to unlock a door lock;

a window driving unit receiving a control signal from a controlling unit and configured to open a window of the vehicle; and the controlling unit electrically connected to the window driving unit and configured to control the window driving unit to open the window of a corresponding door when the door lock is unlocked by the first door lock unlocking unit in a state in which the child lock is set.

2. The active door lock system according to claim 1, further comprising a stop judging unit configured to determine with a speedometer whether or not the vehicle is stopped;

wherein the controlling unit controls the window driving unit to open the window of the corresponding door when the door lock is unlocked by the first door lock unlocking unit in the state in which the child lock is set and the vehicle is stopped.

3. The active door lock system according to claim 2, further comprising a safety judging unit including radar sensors mounted in the vehicle and configured to determine whether or not a passenger safely gets off the vehicle;

wherein the controlling unit controls the window driving unit to open the window of the corresponding door when the door lock is unlocked by the first door lock unlocking unit in the state in which the child lock is set, the vehicle stops, and the passenger safely gets off the vehicle.

4. The active door lock system according to claim 1, wherein the first door lock unlocking unit is operated by a smart key.

5. The active door lock system according to claim 1, wherein the first door lock unlocking unit is operated in a case in which a smart key is positioned in the vehicle.

6. The active door lock system according to claim 1, wherein the window driving unit opens the window by a preset length.

7. The active door lock system according to claim 1, wherein the window driving unit opens the window by a preset time.

8. The active door lock system according to claim 1, further comprising:

a second door lock unlocking unit, including a mechanical relay button positioned at an inner side of the door of the vehicle, and configured to unlock the door lock in a state in which the mechanical relay button is pressed; and a door opening unit including a door lever and configured to open the door of the vehicle in the state in which the mechanical relay button is pressed.

9. The active door lock system according to claim 8, wherein the door opening unit, including an inside door lever, opens the door in a case in which the inside door lever is pulled in the state in which the mechanical relay button is pressed.

10. The active door lock system according to claim 9, wherein the door opening unit changes an angle of the inside door lever when the door is opened.

* * * * *